(12) United States Patent
Xiong et al.

(10) Patent No.: US 9,349,174 B2
(45) Date of Patent: May 24, 2016

(54) ABSOLUTE PHASE MEASUREMENT WITH SECONDARY PATTERN-EMBEDDED FRINGE

(71) Applicant: Microsoft Corporation, Redmond, WA (US)

(72) Inventors: Zhiwei Xiong, Beijing (CN); Feng Wu, Beijing (CN); Yueyi Zhang, Beijing (CN)

(73) Assignee: Microsoft Technology Licensing, LLC, Redmond, WA (US)

( * ) Notice: Subject to any disclaimer, the term of this patent is extended or adjusted under 35 U.S.C. 154(b) by 384 days.

(21) Appl. No.: 13/907,426

(22) Filed: May 31, 2013

(65) Prior Publication Data

US 2014/0354681 A1 Dec. 4, 2014

(51) Int. Cl.
*G06T 7/00* (2006.01)
(52) U.S. Cl.
CPC .............. *G06T 7/00* (2013.01); *G06T 7/0057* (2013.01); *G06T 2207/10152* (2013.01)
(58) Field of Classification Search
None
See application file for complete search history.

(56) References Cited

U.S. PATENT DOCUMENTS

| 7,567,349 | B2 | 7/2009 | Tearney et al. | |
|---|---|---|---|---|
| 9,020,293 | B2 * | 4/2015 | Lo | G06T 5/002 382/275 |
| 2006/0072122 | A1 * | 4/2006 | Hu | G01B 11/2527 356/603 |
| 2010/0207938 | A1 * | 8/2010 | Yau | G01B 11/2513 345/419 |

OTHER PUBLICATIONS

Sjödahl et al, "Measurement of shape by using projected random patterns and temporal digital speckle photography," 1999, Applied Optics y vol. 38, No. 10, pp. 1990-1997.*
"International Search Report & Written Opinion for PCT Patent Application No. PCT/US2014/039645", Mailed Date: Sep. 10, 2014, 13 Pages.
Judge, et. al., "A Review of Phase Unwrapping Techniques in Fringe Analysis", In Optics and Lasers in Engineering, vol. 21, Issue 4, Jan. 1, 1994, pp. 199-239.
Kato, et al., "Automatic Deformation Analysis by a TV Speckle Interferometer Using a Laser Diode", In Applied Optics, Optical Society of America, vol. 32, Issue 1, Jan. 1, 1993, pp. 77-83.
Schreiber, et al., "Phase Shifting Interferometry", In Optical Shop Testing, Jan. 1, 1974, pp. 547-666.
Wissmann, et al., "Fast and Accurate 3D Scanning Using Coded Phase Shifting and High Speed Pattern Projection" In International Conference on 3D Imaging, Modeling, Processing, Visualization and Transmission, May 16, 2011, pp. 108-115.
Zhang, Song, "High-resolution, High-speed 3-D Dynamically Deformable Shape Measurement Using Digital Fringe Projection Techniques", In Advances in Measurement Systems, Jan. 1, 2010, 22 Pages.

(Continued)

*Primary Examiner* — David F Dunphy
(74) *Attorney, Agent, or Firm* — Steve Wight; Sandy Swain; Micky Minhas

(57) ABSTRACT

Multiple images of a scene are captured while a phase-shifted fringe embedded with a secondary pattern is projected onto the scene. A wrapped phase map is generated based on the captured images, and a continuous region mask is determined to segment the wrapped phase map into multiple continuous regions. A period disparity of the fringe is determined for each region based at least in part on the embedded secondary pattern, and the regional period disparities are applied to a spatially unwrapped phase map to produce an absolute phase map and finally a depth map.

19 Claims, 13 Drawing Sheets

(56) References Cited

OTHER PUBLICATIONS

Zhang, et al., "Unambiguous 3D Measurement From Speckle-Embedded Fringe", In Applied Optics, Optical Society of America, vol. 52, Issue 32, Nov. 2013, pp. 7797-7805.

Zhang, et al., "Hybrid Structured Light for Scalable Depth Sensing", In 19th IEEE International Conference on Image Processing, Sep. 30, 2012, pp. 17-20.

PCT 2nd Written Opinion mailed Feb. 25, 2015 for PCT applicaiton No. PCT/US2014/039645, 9 pages.

Chen, et al., "High speed 3-D Surface Profilometry Employing Trapezoidal HSI Phase Shifting Method with Multi-band Calibration for Colour Surface Reconstruction", In Proceedings of in Audio, Transactions of the IRE Professional Group, Aug. 2010, 20 pages.

Chen, et al., "Modulated Phase-Shifting for 3D Scanning", In Proceedings of in IEEE Conference on Computer Vision and Pattern Recognition, Jun. 23, 2008, 8 pages.

Genderen, et al., "The ITC Filter for Improving ERS SAR Interferograms", In Proceedings of in Third ERS Symposium on Space at the Service of our Environment, Mar. 14, 1997, 5 pages.

Huang, et al., "Dynamic Phase Measurement in Shearography by Clustering Method and Fourier Filtering", In Proceedings of in Optics Express, vol. 19 Issue 2, Jan. 17, 2011, 10 pages.

Stoykova, et al., "Analysis of a Multi-Wavelength Multi-Camera Phase-Shifting Profilometric System for Real-Time Operation", In Optics Communications, Feb. 9, 2013, 10 pages.

Wang, Yinyan, "Measurement of Thermally Induced Warpage of BGA Packages/Substrates Using Phase-Stepping Shadow Moire" In Proceedings of the 1997 1st Electronic Packaging Technology Conference, Oct. 8, 1997, 9 pages.

Zuo, et al., "High-Speed Three-Dimensional Profilometry for Multiple Objects with Complex Shapes", In Proceedings of in Optics Express, Aug. 13, 2013, 18 pages.

* cited by examiner

ABSOLUTE PHASE MEASUREMENT WITH SECONDARY PATTERN-EMBEDDED FRINGE

BACKGROUND

Three-dimensional shape measurement plays an essential role in numerous fields, including, but not limited to, manufacturing, medicine, security, and entertainment. Among various available 3D scanning techniques, there is a range of single-shot techniques with projection of elaborate space-coded patterns, which are suitable for 3D measurement in time critical conditions. The well-known Kinect® depth camera belongs to this category. (The Kinect® depth camera was developed by PrimeSense and purchased by Microsoft Corporation, Redmond, Wash.) Kinect® projects an infrared speckle pattern (i.e., a scattered dot pattern) that is highly random and thus provides enough distinguishability for detecting the pattern deformation in space. However, any form of space coding implies local depth smoothness and neighborhood dependency during decoding, which inevitably leads to loss of accuracy and data density.

In contrast, phase shifting profilometry (PSP) with fringe projection is widely adopted due to its high accuracy and high data density. Generally, PSP is suitable for static measurement as it requires multiple patterns to be projected sequentially. For the most commonly used sinusoidal fringe, at least three images are needed to generate a phase map. Moreover, due to the periodicity of the sinusoidal signal, the obtained phase map is wrapped. To recover the absolute phase for unambiguous 3D measurement of complex scenes, the actual image acquisition number is usually much larger than three. The advancement of camera and projector technology has enabled fast and accurate 3D scanning with PSP. Further acceleration of the measurement process may be obtained by reducing the image acquisition number for absolute phase recovery.

SUMMARY

This document describes phase shifting profilometry (PSP) using a secondary pattern-embedded fringe pattern that enables an accurate phase ambiguity solution using the theoretical minimum of only three images. A secondary pattern is embedded into three phase-shifted fringe patterns such that the phase calculation is independent of the embedded secondary pattern, the secondary pattern is embedded without reducing the amplitude of the fringe, and the frequency of the fringe is not restricted. In one aspect, the secondary pattern is a highly distinguishable speckle pattern. A wrapped phase map is generated from three received images, and a continuous region mask is determined to indicate, within the wrapped phase map, multiple continuous regions that each corresponds to a continuous surface within a scene from which the images were captured. Based on the embedded secondary pattern, a period disparity voting strategy is used to recover the absolute phase for each region.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The term "techniques," for instance, may refer to device(s), system(s), method(s) and/or computer-readable instructions as permitted by the context above and throughout the document.

BRIEF DESCRIPTION OF THE DRAWINGS

The detailed description is described with reference to the accompanying figures. In the figures, the left-most digit(s) of a reference number identifies the figure in which the reference number first appears. The same numbers are used throughout the drawings to reference like features and components.

DETAILED DESCRIPTION

The example phase shifting profilometry (PSP) with a secondary pattern-embedded sinusoidal fringe pattern described herein enables a phase ambiguity solution using the theoretical minimum of only three images. Simultaneous satisfaction of three conditions results in accuracy of the phase measurement. First, the phase calculation is independent of the embedded signal; second, the amplitude of the fringe is not reduced to accommodate the embedded signal, thereby retaining the signal-to-noise ratio (SNR) of the PSP; and third, a high frequency fringe may be used to achieve a high accuracy measurement.

Several challenges exist in designing embedded codes for three-step PSP given the three conditions above. For example, to satisfy the first condition, the embedded signal should be the same in each of the three images, which excludes the possibility of coding in the time domain. The second condition significantly limits the room left for space coding. If the frequency of fringe is high, as indicated by the third condition, it is unreliable to identify the fringe order based on the difference of pixel intensity in each period.

The underlying ambiguity in a wrapped phase map is limited in two aspects. First, given the wrapped phase of each pixel, the possible disparity from the absolute phase is restricted by the number of periods of fringe. Second, the period disparity for each pixel on a continuous surface will be the same after direct spatial phase unwrapping.

A phase ambiguity solution using the theoretical minimum of only three images is obtained by using three secondary pattern-embedded fringe patterns that simultaneously satisfy each of the three conditions defined above. Then, relying on the embedded secondary pattern signal, an efficient and robust voting strategy is used to recover the absolute phase region-by-region, rather than pixel-by-pixel. The result is an unambiguous three-step PSP that provides fast and accurate 3D scanning capable of measuring complex scenes with multiple isolated objects and abrupt surface changes.

Example Environment

Figure 1:
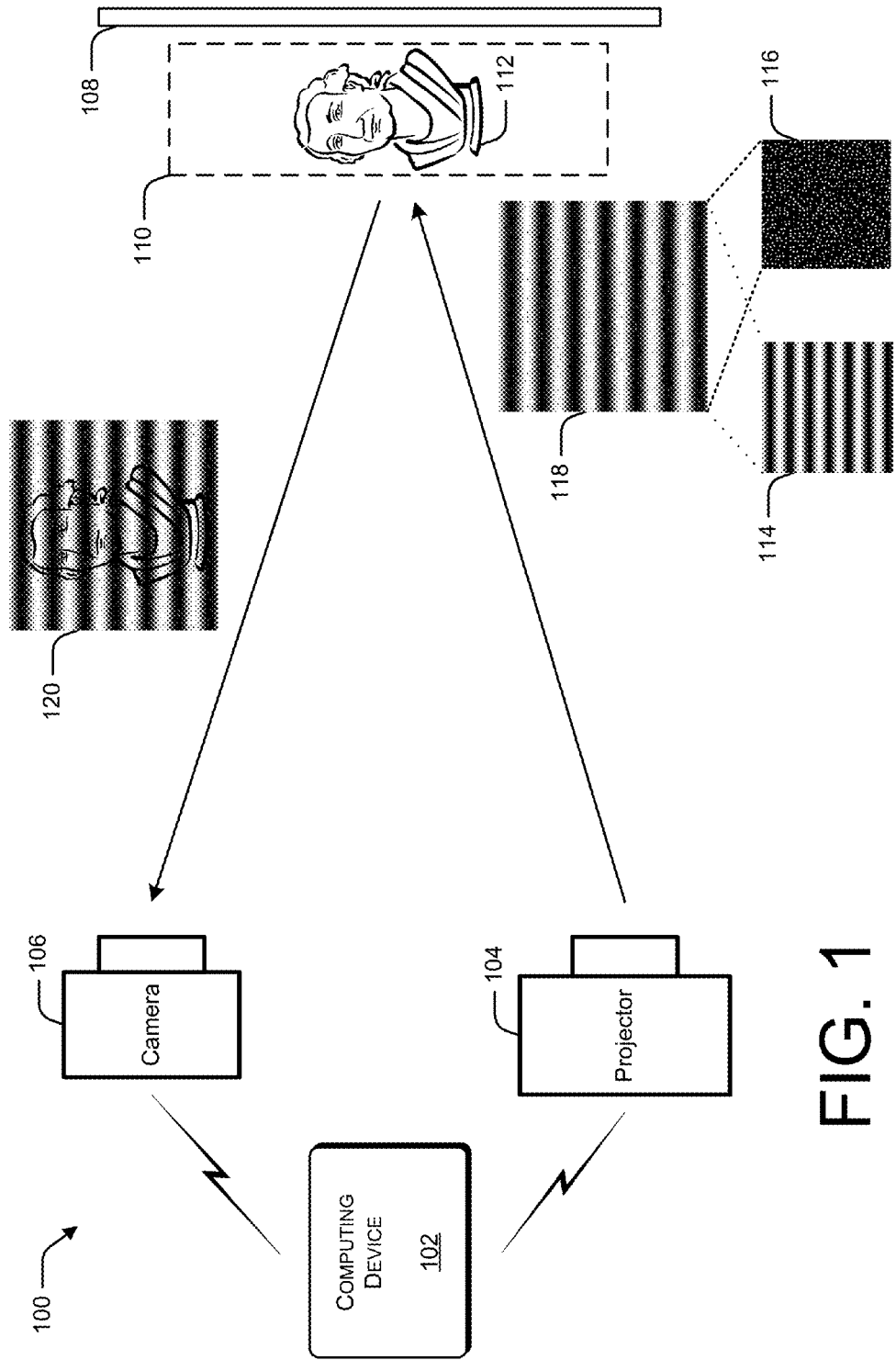
FIG. 1 is a pictorial diagram of an example environment in which phase shifting profilometry with secondary pattern-embedded fringe may be implemented.

FIG. 1 illustrates an example environment 100 in which phase shifting profilometry (PSP) with secondary pattern-embedded fringe projection may be implemented. The example environment 100 includes computing device 102, communicatively coupled to projector 104 and camera 106, and a reference plane 108 (e.g., a smooth wall or screen), oriented normally to the light path of the projector and the camera. Environment 100 also includes a scene 110, which includes one or more objects 112.

To obtain three dimensional measurements of the scene 110, the projector 104 projects a fringe pattern 114 embedded with a secondary pattern 116. As the secondary pattern-embedded fringe 118 is projected onto the scene 110, the camera 106 captures an image 120. FIG. 1 illustrates a horizontal fringe pattern 114. PSP as described herein may also be implemented using other fringe pattern orientations (e.g., a vertical fringe pattern).

Figure 2:
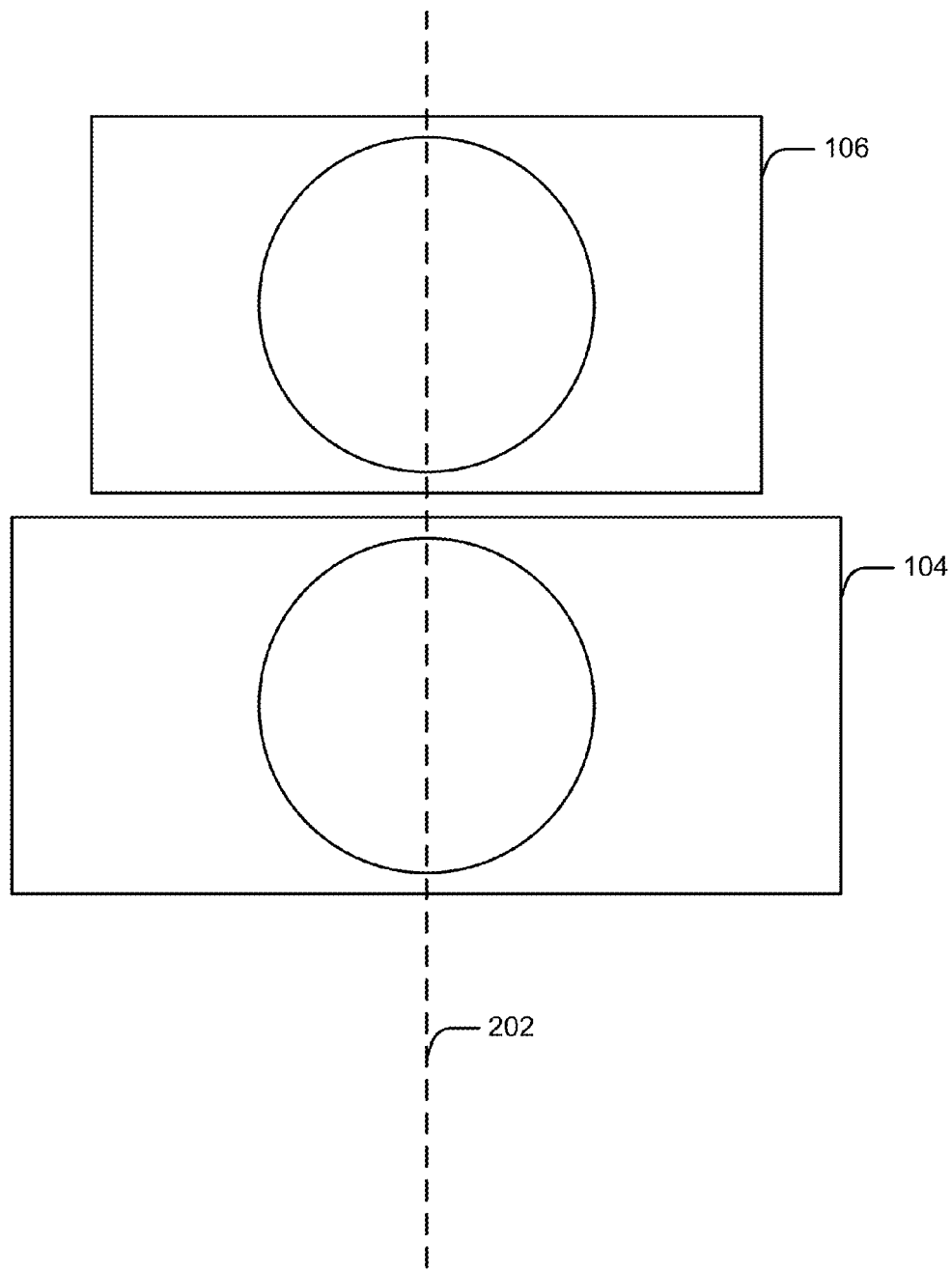
FIG. 2 is a pictorial diagram illustrating strict vertical alignment of an example projector and an example camera.

FIG. 2 illustrates an example vertical alignment of projector 104 and camera 106. As illustrated, in an example implementation, the light paths of projector 104 and camera 106 are strictly aligned in a vertical direction, as indicated by vertical line 202. With the projector and camera vertically aligned, an image captured by the camera will be shifted vertically, but not horizontally, with reference to an image projected from the projector. While strict vertical alignment is not required, if the camera and projector are not vertically aligned, then a horizontal shift will also exist, and such a horizontal shift will need to be figured into the various calculations described herein.

Example Computing Device

Figure 3:
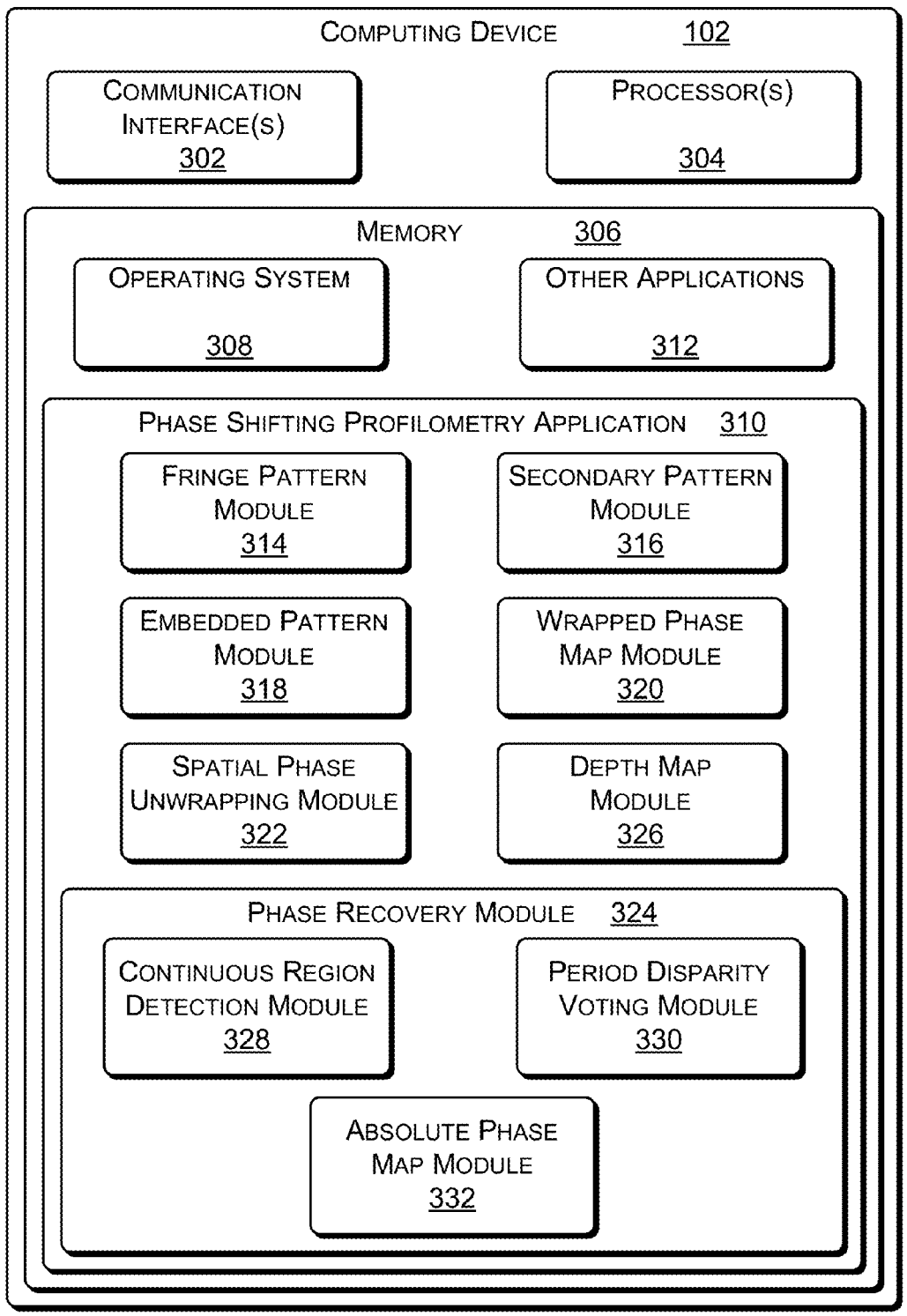
FIG. 3 is a block diagram that illustrates components of an example computing device configured to implement phase shifting profilometry.

FIG. 3 illustrates components of an example computing device 102 implementing phase shifting profilometry as described herein. Computing device 102 represents any type of device that may implement phase shifting profilometry, including, but not limited to, a desktop computer system, a laptop computer system, a tablet computer system, a mobile computing device, and so on. Example computing device 102 includes one or more communication interfaces 302, one or more processors 304, and memory 306. Communication interfaces 302 enable computing device 102 to communicate with other devices, such as projector 104 and camera 106. Communication interfaces 302 may include, but are not limited to, a network interface, audio/video inputs/outputs, a wired interface, a wireless interface, and so on.

An operating system 308, a phase shifting profilometry application 310, and one or more other applications 312 are stored in memory 306 as computer-readable instructions, and are executed, at least in part, on processor 304.

Phase shifting profilometry application 310 includes a fringe pattern module 314, a secondary pattern module 316, an embedded pattern module 318, a wrapped phase map module 320, a spatial phase unwrapping module 322, a phase recovery module 324, and a depth map module 326. Fringe pattern module 314 generates a sequence of sinusoidal fringe patterns with incremental phase shift. Secondary pattern module 316 generates a secondary pattern to be embedded with the fringe pattern. Embedded pattern module 318 embeds the secondary pattern with the fringe pattern. Wrapped phase map module 320 generates a wrapped phase map based on three captured images. Spatial phase unwrapping module 322 produces a spatially unwrapped phase map from the wrapped phase map.

Phase recovery module 324 determines an absolute phase map. Phase recovery module 324 includes a continuous region detection module 328, a period disparity voting module 330, and an absolute phase map module 332.

Continuous region detection module 328 generates a continuous region map from the wrapped phase map based on discontinuities caused by isolated objects or abrupt surface changes. Period disparity voting module 330 performs a voting process to determine the period disparity for each continuous region (i.e., the regional period disparity). Absolute phase map module 332 uses the regional period disparity values to recover an absolute phase map.

Depth map module 326 uses the absolute phase map to produce a depth map that represents the 3D shape of the captured scene.

Although illustrated in FIG. 3 as being stored in memory 306 of computing device 102, phase shifting profilometry application 310, or portions thereof, may be implemented using any form of computer-readable media that is accessible by computing device 102. Furthermore, in alternate implementations, one or more components of operating system 308, phase shifting profilometry application 310, and other applications 312 may be implemented as part of an integrated circuit that is part of, or accessible to, computing device 102.

Computer-readable media includes, at least, two types of computer-readable media, namely computer storage media and communications media.

Computer storage media includes volatile and non-volatile, removable and non-removable media implemented in any method or technology for storage of information such as computer readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other non-transmission medium that can be used to store information for access by a computing device.

In contrast, communication media may embody computer readable instructions, data structures, program modules, or other data in a modulated data signal, such as a carrier wave, or other transmission mechanism. As defined herein, computer storage media does not include communication media.

Three-Step Phase Shifting

Figure 4:
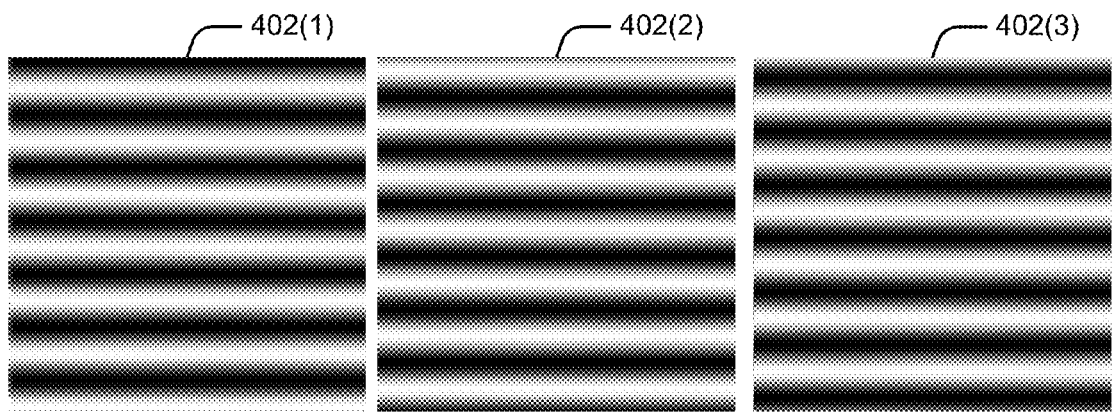
FIG. 4 is a pictorial diagram of three example phase-shifted fringe patterns.

FIG. 4 illustrates a sequence of three sinusoidal fringe patterns 402 with incremental phase shift. In three-step phase shifting profilometry (PSP) with horizontal fringe, the $k^{th}$ (k=1, 2, 3) fringe pattern is described as $$F_k(x, y) = C + A\cos\left(\frac{y}{H}2\pi N + \frac{2\pi}{3}k\right) \quad (1)$$

where C, A, N, and H are constants representing the DC offset, the amplitude, the number of periods, and the vertical resolution of the projection pattern, respectively. To perform three-step PSP, the sequence of fringe patterns 402 is projected using the projector 104, and a sequence of images are then captured using camera 106.

The corresponding captured image is described as $$I_k(x', y') = I_C(x', y') + I_A(x', y')\cos\left[\phi(x', y') + \frac{2\pi}{3}k\right] \quad (2)$$

where $I_C(x',y')=\alpha(x',y')[C+\beta(x',y')]$ and $I_A(x',y')=\alpha(x',y')A$. (x', y') denotes the camera coordinates to differentiate from (x, y) denoting the projector coordinates, and $\alpha(x', y')$ and $\beta(x', y')$ represent the albedo and the ambient illumination, respectively.

There are three unknowns in Equation (2), namely, the DC offset $I_C(x', y')$, the amplitude $I_A(x', y')$, and the phase $\phi(x', y')$. Accordingly, at least three images are needed to solve the phase as:

$$\phi(x', y') = \tan^{-1}\left\{\frac{\sqrt{3}\,[I_2(x', y') - I_1(x', y')]}{2I_3(x', y') - I_2(x', y') - I_1(x', y')}\right\} \quad (3)$$

However, the above phase only ranges from 0 to $2\pi$, which will result in $2\pi$ discontinuities in the phase map. Thus, phase unwrapping is used to convert the wrapped phase to the absolute phase:

$$\phi_a(x',y')=\phi(x',y')+d(x',y')\times 2\pi \quad (4)$$

where the period disparity d(x', y') is an integer within [0, N−1]. Once the absolute phase is obtained, the depth at each scene point can be calculated through triangulation between the projector and the camera.

Secondary Pattern Generation

As discussed above, accuracy of the phase measurement is dependent upon three conditions. First, the phase calculation is independent of the embedded signal; second, the amplitude of the fringe is not reduced to accommodate the embedded signal, thereby retaining the signal-to-noise ratio (SNR) of the PSP; and third, a high frequency fringe may be used to achieve a high accuracy measurement. Furthermore, as discussed above, to satisfy the first condition, the embedded signal should be the same in each of the three images, which excludes the possibility of coding in the time domain; the second condition significantly limits the room left for space coding; and if the frequency of fringe is high, as indicated by the third condition, it is unreliable to identify the fringe order based on the difference of pixel intensity in each period.

While a fringe may be embedded with other secondary patterns such that the three conditions above are satisfied, in an example implementation, a simulated speckle pattern is generated as the secondary pattern.

Speckle is widely used in digital image correlation (DIC) techniques, with applications ranging from macroscopic mechanical testing to surface profile measurements. Originally, speckle refers to an interference pattern caused by coherent radiation. However, for DIC techniques, artificial speckle is often simulated by randomly scattering white dots on a black background.

Figure 5:
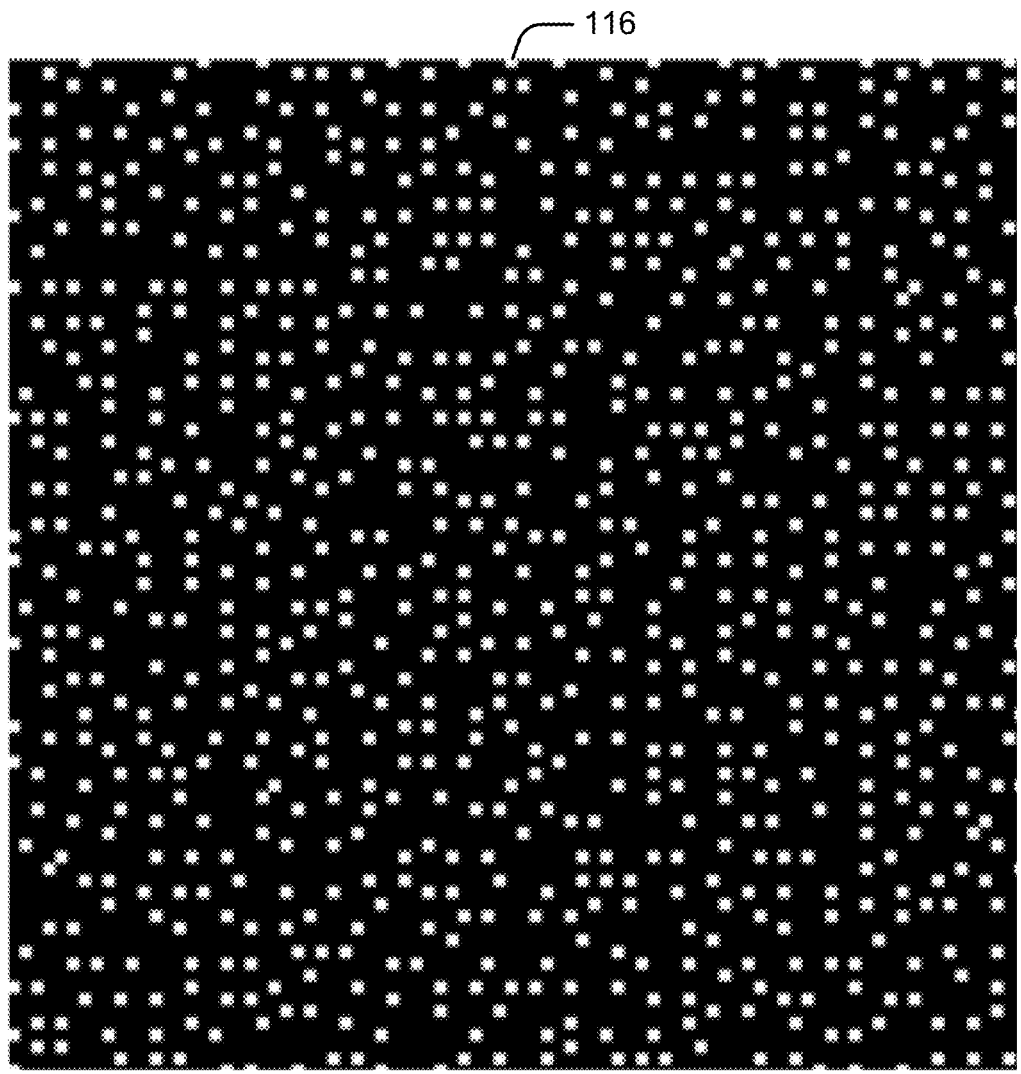
FIG. 5 is a pictorial diagram of an example simulated random speckle pattern.

FIG. 5 illustrates an example simulated speckle pattern 116. In an example implementation, a 2D binary speckle pattern is generated according to rules that are designed to ensure distinguishability of the speckle in both a projected pattern and in a captured image. In an example implementation, rules govern the speckle size and speckle density. For example, speckle size is defined such that each white dot has a regular size of K×K pixels, where K is determined by the resolution of the projector and the camera being used. Speckle density is defined such that, within the speckle pattern, in each 3K×3K area (i.e., 3×3 dots), one dot is white.

Distinguishability of speckle is measured by patch-wise self-similarity when the pattern is deformed in space. A commonly used criterion for measuring self-similarity is normalized cross correlation (NCC) such that, given two patches, f and g, each having the same size within a speckle pattern, the NCC between f and g is calculated as:

$$\gamma(f, g) = \frac{\sum_{u,v}[f(u, v) - \bar{f}][g(u, v) - \bar{g}]}{\sqrt{\sum_{u,v}[f(u, v) - \bar{f}]^2 \sum_{u,v}[g(u, v) - \bar{g}]^2}} \quad (5)$$

where $\bar{f}$ and $\bar{g}$ denote the average intensities in the two patches. The NCC calculation is invariant to pixel intensity changes that may be caused by different kinds of degradation during image capture, including, but not limited to, resampling, attenuation, defocus, and noise.

Figure 6:
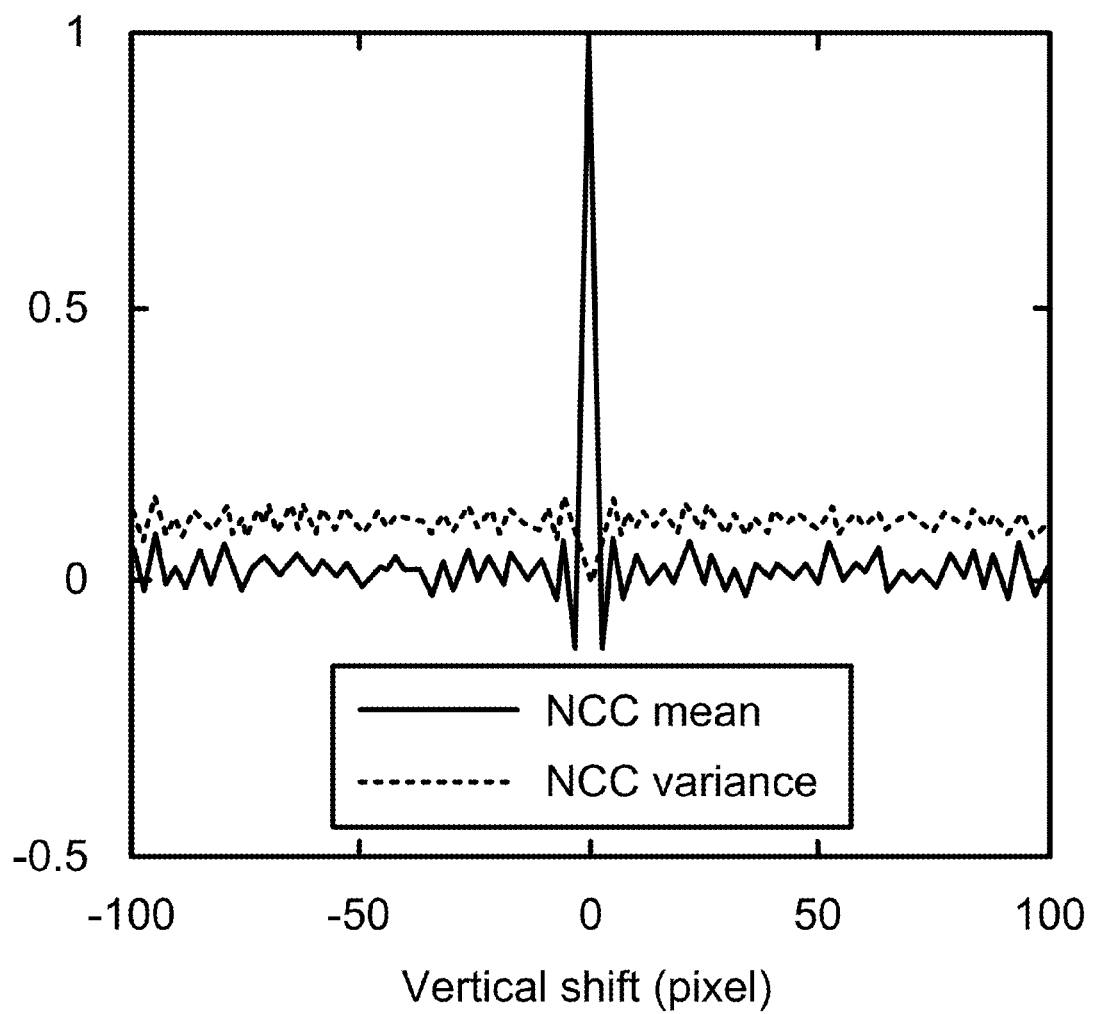
FIG. 6 is a line graph illustrating normalized cross correlation (NCC) statistics for a speckle image captured at a reference plane.

FIG. 6 illustrates NCC statistics for a speckle image captured at a reference plane. For example, FIG. 6 may represent statistics for an image captured by camera 106 when speckle pattern 116 is projected onto reference plane (e.g., wall) 108 if scene 110 is empty. The example statistics illustrated in FIG. 6 are calculated in terms of each 5×5 patch with respect to pixel-by-pixel vertical shift in the image. As illustrated in FIG. 6, there is a distinct peak at zero shift in the NCC mean curve, which indicates that the simulated speckle pattern 116 is highly distinguishable, even in the captured image.

Fringe with Embedded Secondary Pattern Generation

As can be observed from equations (2) and (3), $I_C(x', y')$ will be canceled during the phase calculation. This property indicates that the DC offset of fringe does not need to be constant. Accordingly, it is possible to embed a 2D signal into the fringe without changing the phase calculation. However, in order for equation (3) to stand, in three-step PSP, the embedded signal must be the same in each of the three images. This restriction brings two challenges. First, as discussed above, coding in the time domain is not allowed, but if the amplitude of fringe is maintained, there is very limited room left for space coding. Second, as the frequency of the fringe increases, it will be unreliable to identify the fringe order based on the difference of pixel intensity in each period.

To overcome these challenges, three speckle-embedded fringe patterns are designed in which the random distribution of the speckle, rather than the pixel intensity, disambiguates the phase. The speckle-embedded fringe patterns that are used for three-step PSP, and can be written as:

$$P_k(x,y)=B(x,y)Z(x,y)+F_k(k,y), k=1,2,3 \quad (6)$$

where $Z(x, y)\in\{0,1\}$ describes the distribution of speckle in accordance with the speckle pattern described above, and B(x, y) controls the intensity of the speckle. As noted above, because the embedded speckle signal is the same in each of the three speckle-embedded fringe patterns, the phase calculation remains unchanged.

In an example implementation, the pattern is projected in L-bit grayscale and the DC offset and the amplitude of fringe are set as $C=A=2^{L-1}$ to maximize the signal-to-noise ratio (SNR) of PSP. To make use of the residual intensity while retaining the amplitude of fringe, one possible solution is to assign B(x, y) as:

$$B(x,y)=2^L-\max\{F_k(x,y)\} \quad (7)$$

However, the amount of speckle signal that can be embedded is significantly reduced when $\max\{F_k(x, y)\}$ equals or gets very close to $2^L$. Accordingly, the phase at those locations may be ambiguous.

Figure 7:
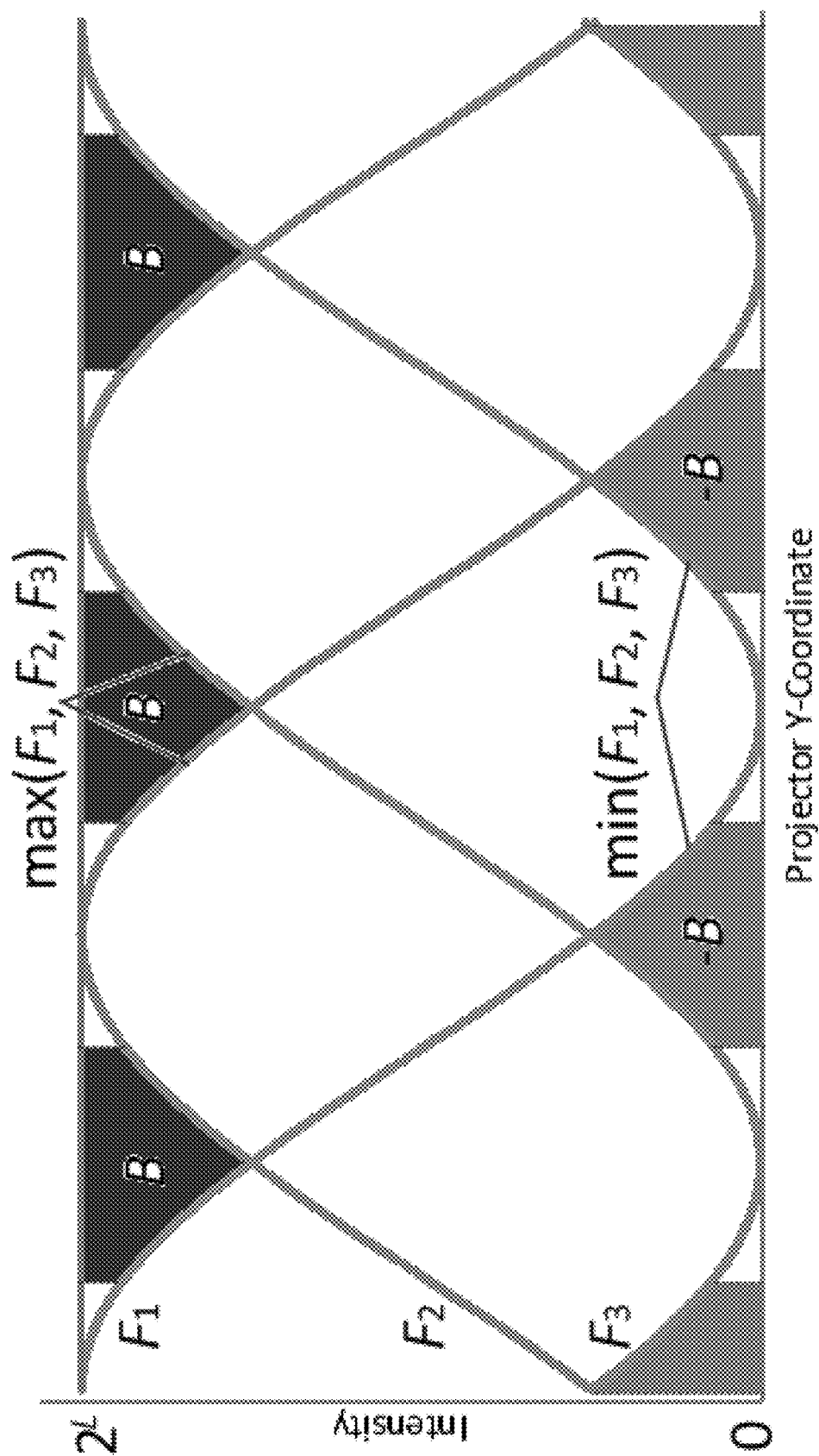
FIG. 7 is a graph illustrating an example solution for embedding a secondary pattern in a fringe pattern.

FIG. 7 illustrates another solution for embedding the speckle pattern in the fringe pattern. Recognizing that the intensity of speckle may be either positive or negative, another solution is to assign B(x, y) as:

$$B(x, y) = \begin{cases} 2^L - B_{max} & 2^L - B_{max} \geq B_{min} \\ -B_{min} & \text{otherwise} \end{cases} \quad (8)$$

where $B_{max}=\max\{F_k(x, y)\}$ and $B_{min}=\min\{F_k(x, y)\}$. In this way, the residual intensity of fringe is more efficiently exploited. For example, as illustrated in FIG. 7, portions of the fringe pattern are embedded in the residual intensity of the fringe both above (in the areas labeled "B") and below (in the areas labeled "−B") the sinusoidal curves of the fringe pattern.

Figure 8:
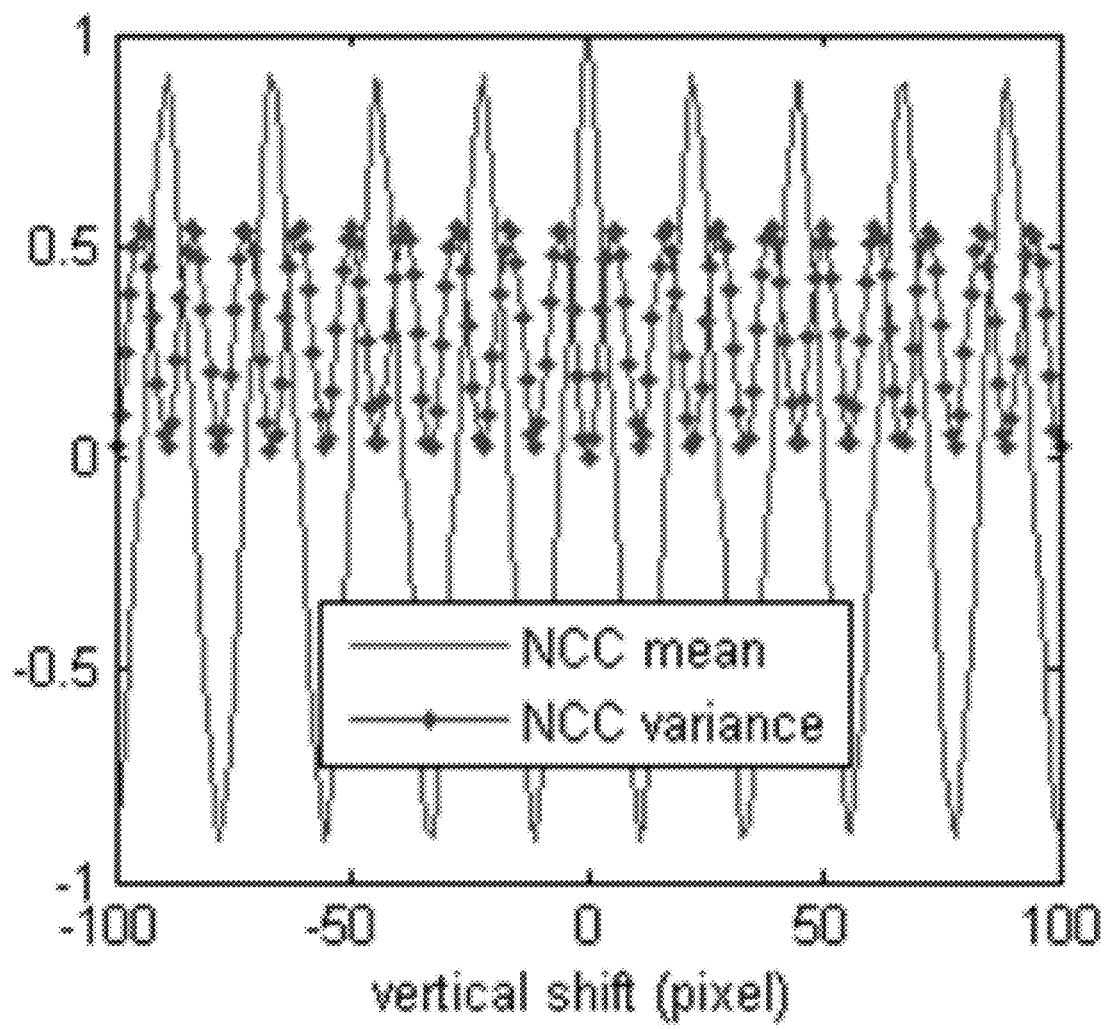
FIG. 8 is a line graph illustrating normalized cross correlation (NCC) statistics for a speckle-embedded fringe image captured at a reference plane.

FIG. 8 illustrates NCC statistics for a speckle-embedded fringe image captured at a reference plane. For example, similar to FIG. 6, FIG. 8 may represent statistics for an image captured by camera 106 when speckle-embedded fringe pattern 118 is projected onto reference plane (e.g., wall) 108 if scene 110 is empty. As illustrated in FIG. 8, due to the limited intensity range, the distinguishability of speckle is greatly reduced when embedded in the fringe pattern. In particular, periodic secondary peaks exist in the NCC mean curve due to the presence of the fringe. Considering the deformation caused by different surface changes, it would be unreliable to identify the fringe order by relying on the embedded speckle locally. Therefore, a robust voting strategy is used to disambiguate the phase region by region.

Absolute Phase Recovery

Figure 9:
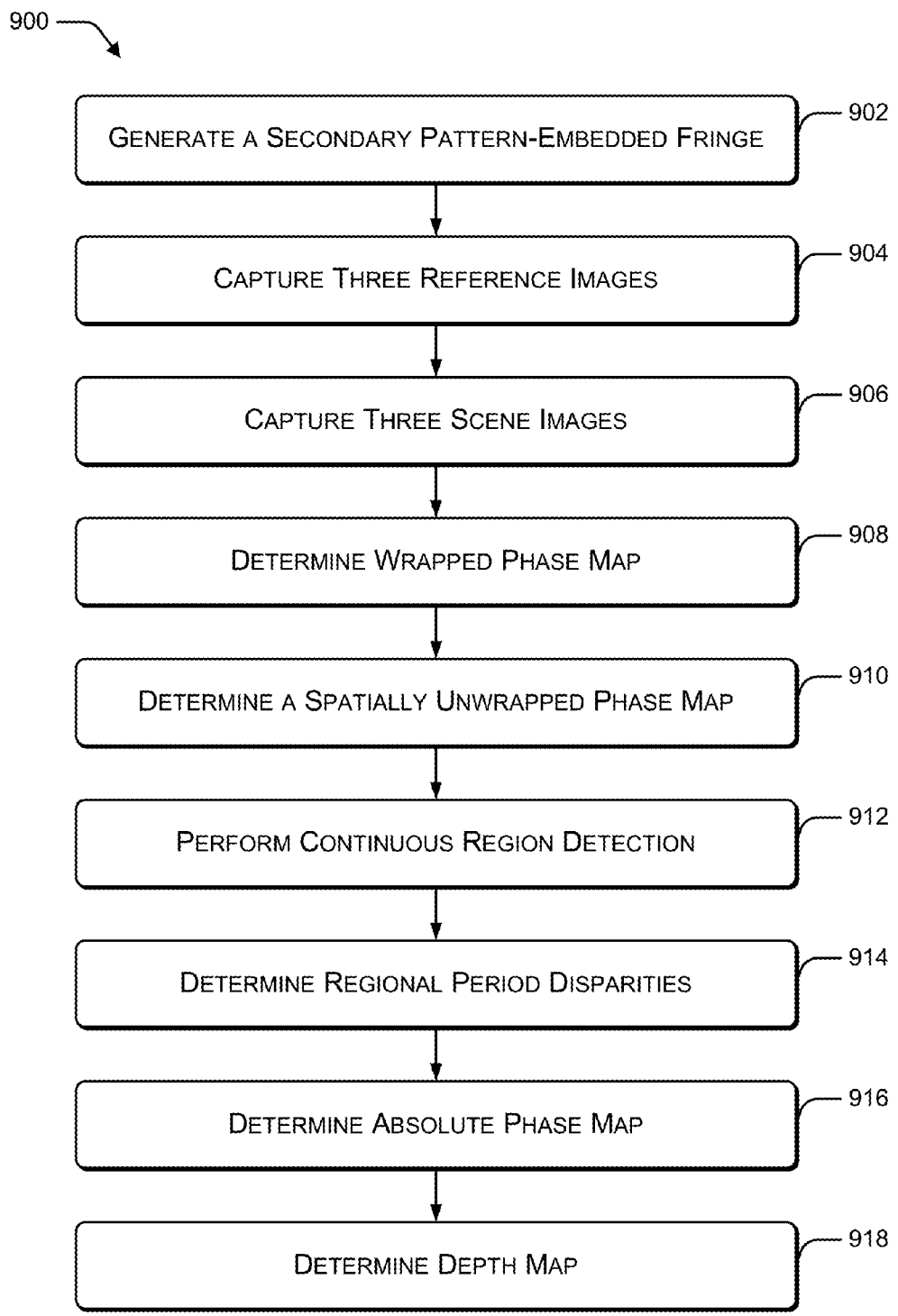
FIG. 9 is a flow diagram of an example process for performing phase shifting profilometry using speckle-embedded fringe.
Figure 10:
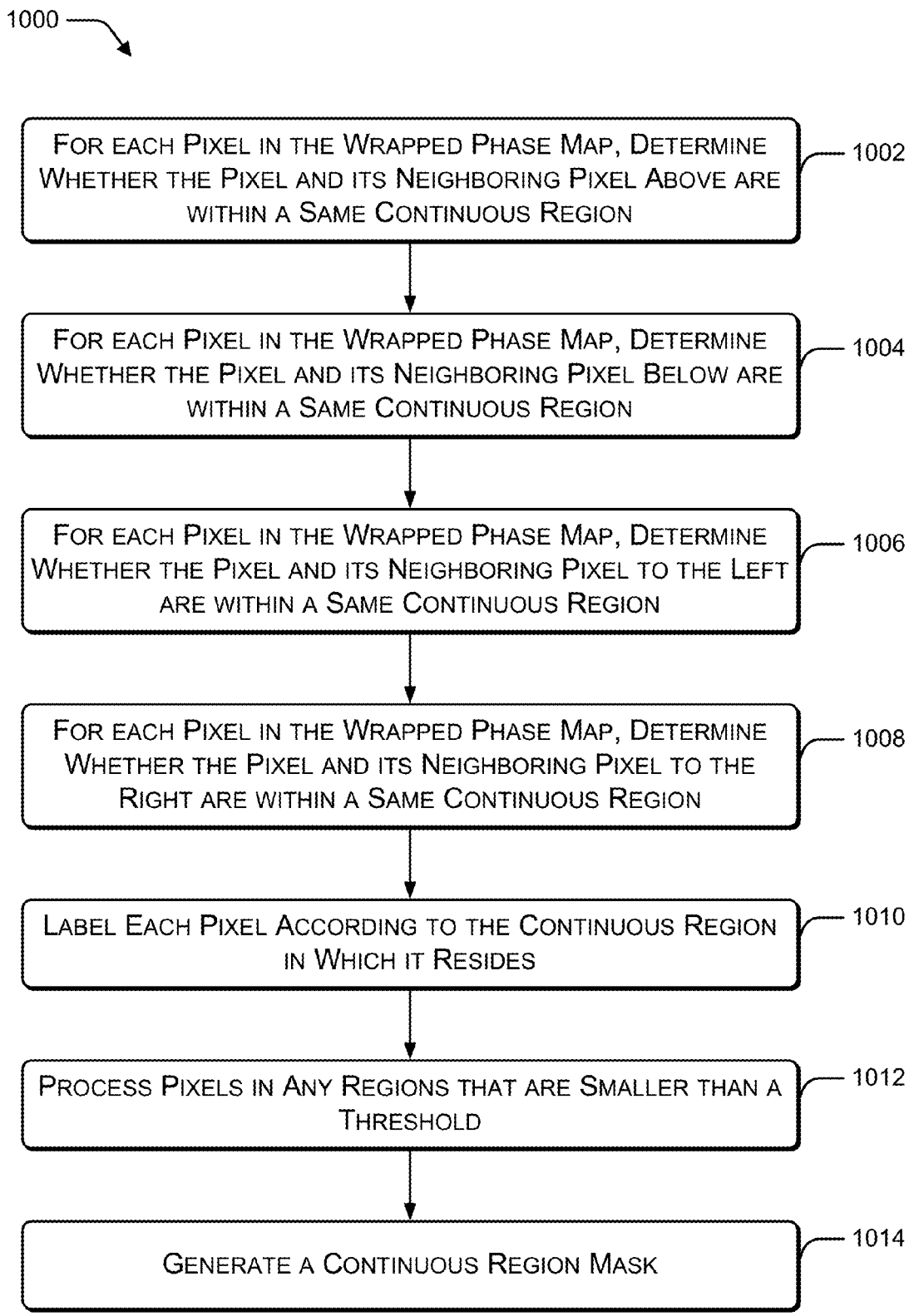
FIG. 10 is a flow diagram of an example process for performing continuous region detection within a wrapped phase map.
Figure 12:
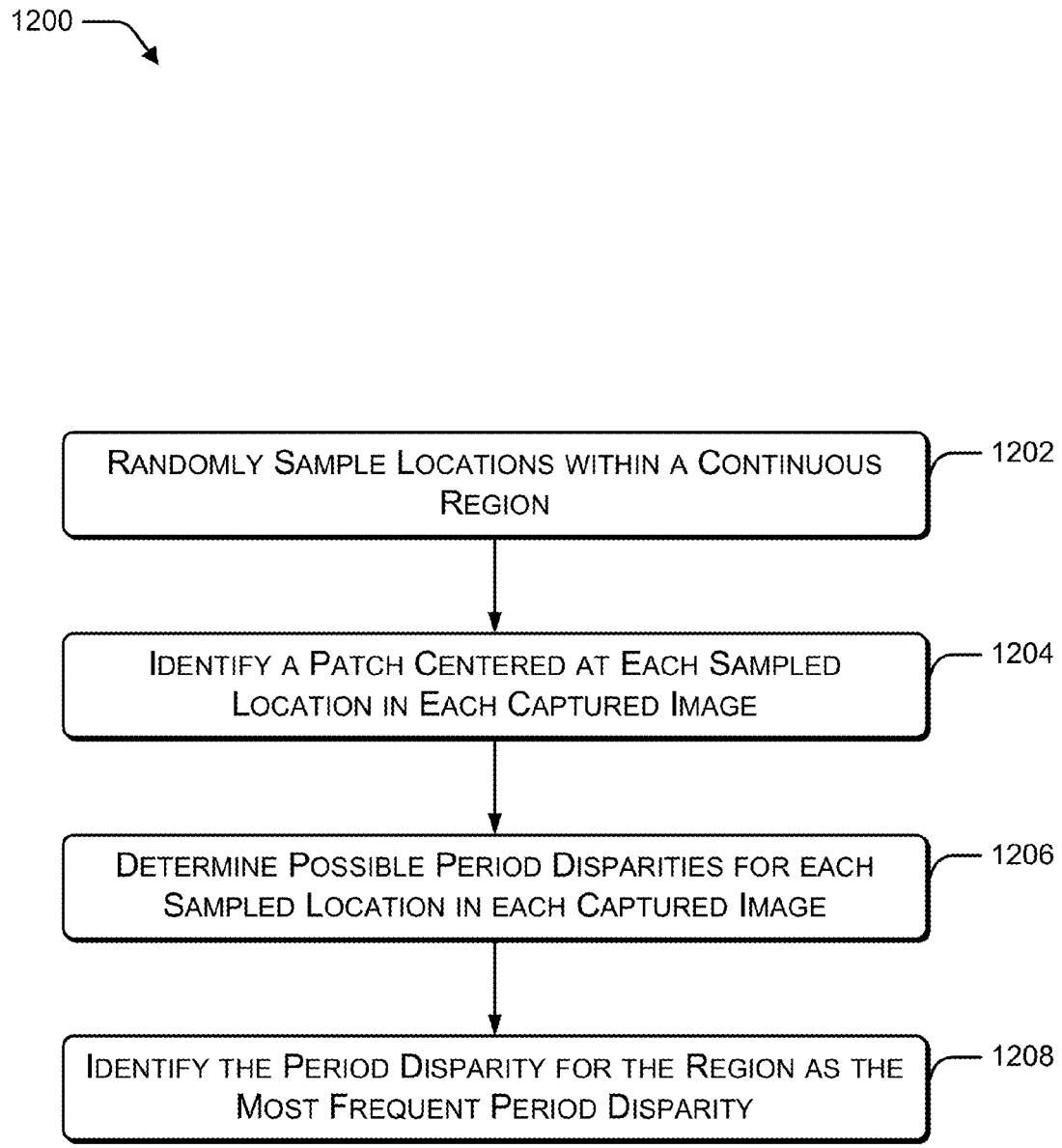
FIG. 12 is a flow diagram of an example process for determining the period disparity for a particular region in a continuous region mask.

FIGS. 9, 10, and 12 illustrate example processes for performing phase-shifted profilometry using speckle-embedded fringe as described herein. These processes are illustrated as collections of blocks in logical flow graphs, which represent sequences of operations that can be implemented in hardware, software, or a combination thereof. In the context of software, the blocks represent computer-executable instructions stored on one or more computer storage media that, when executed by one or more processors, cause the processors to perform the recited operations. Note that the order in which the processes are described is not intended to be construed as a limitation, and any number of the described process blocks can be combined in any order to implement the processes, or alternate processes. Additionally, individual blocks may be deleted from the processes without departing from the spirit and scope of the subject matter described herein. Furthermore, while these processes are described with reference to the computing device 102 described above with reference to FIGS. 1 and 3, other computer architectures may implement one or more portions of these processes, in whole or in part.

FIG. 9 illustrates an example process for performing phase-shifted profilometry using speckle-embedded fringe as described herein.

At block 902, a secondary pattern-embedded fringe is generated. For example, a fringe pattern is generated or determined by fringe pattern module 314; a secondary pattern is generated or determined by secondary pattern module 316; and the secondary pattern is embedded into the fringe pattern by the embedded pattern module 318.

At block 904, reference images are captured. For example, three phase-shifted speckle-embedded fringe patterns are projected toward reference plane 108 by projector 104 while the scene 110 is empty. Three corresponding reference images are captured by camera 106.

At block 906, scene images are captured. For example, three phase-shifted speckle-embedded fringe patterns are projected onto scene 110. Three corresponding images of the scene are captured by camera 106.

At block 908, a wrapped phase map is determined. For example, after three images $\{I_k\}_{k=1}^3$ are captured (one for each phase-shifted speckle-embedded fringe pattern), wrapped phase map module 320 calculates a wrapped phase map $\Phi_W$ according to equation (3). Wrapped phase map $\Phi_W$ includes two kinds of discontinuities. One is the $2\pi$ discontinuities caused by the periodicity of fringe, which for horizontal fringe, occurs in the vertical direction. The second discontinuity in the wrapped phase map is caused by isolated objects or abrupt surface changes, which may occur in any direction.

At block 910, a spatially unwrapped phase map $\Phi_R$ is determined. For example, spatial phase unwrapping module 322 removes the $2\pi$ discontinuities from the wrapped phase map. Accordingly, in the spatially unwrapped phase map $\Phi_R$, the phase value of each pixel on a continuous surface has a common disparity from the absolute phase value.

At block 912, continuous region detection is performed. For example, continuous region detection module 328 analyzes pixel phase values throughout the wrapped phase map $\Phi_W$ to generate a continuous region mask $\Psi$ that indicates the boundaries of continuous surfaces. Continuous region detection is described in further detail below, with reference to FIGS. 10 and 11.

At block 914, regional period disparities are determined. For example, period disparity voting module 330 performs a voting process based on the embedded speckle to determine, for each continuous region, the period disparity from the absolute phase. The period disparity voting process is described in further detail below, with reference to FIGS. 12 and 13.

At block 916, an absolute phase map is determined. For example, absolute phase map module 332 applies the determined period disparity for each region to the spatially unwrapped phase map to generate an absolute phase map.

At block 918, a depth map is determined. For example, depth map module 326 generates a depth map based on the absolute phase map.

Continuous Region Detection

FIG. 10 illustrates an example process for performing continuous region detection within a wrapped phase map. In the wrapped phase map $\Phi_W$, there are two kinds of discontinuities. One is the $2\pi$ discontinuities caused by the periodicity of fringe, which for horizontal fringe, occurs in the vertical direction. As described above, the $2\pi$ discontinuities are removed in the generation of the spatially unwrapped phase map.

The second discontinuity in the wrapped phase map is caused by isolated objects or abrupt surface changes, which may occur in any direction. The second type of discontinuity indicates the boundaries of continuous surfaces. Region segmentation is performed on the wrapped phase map $\Phi_W$ based on the discontinuities caused by isolated objects or abrupt surface changes. In an example implementation, region segmentation is based on a two-pass floodfill algorithm, in which regions are labeled during a first pass, and regions smaller than a threshold are handled during a second pass.

At block 1002, for each pixel in the wrapped phase map, it is determined whether or not the pixel and its neighboring pixel above are within a same continuous region. In an example implementation, a particular pixel and its neighboring pixel directly above are determined to be within the same continuous region when the difference between the phase value of the particular pixel and the phase values of each of the three pixels above the particular pixel (the pixel directly above the particular pixel, the pixel above and to the left of the particular pixel, and the pixel above and to the right of the particular pixel) is less than a predefined threshold value.

At block 1004, for each pixel in the wrapped phase map, it is determined whether or not the pixel and its neighboring pixel below are within a same continuous region. In an example implementation, a particular pixel and its neighboring pixel directly below are determined to be within the same continuous region when the difference between the phase value of the particular pixel and the phase values of each of the three pixels below the particular pixel (the pixel directly below the particular pixel, the pixel below and to the left of the particular pixel, and the pixel below and to the right of the particular pixel) is less than a predefined threshold value.

At block 1006, for each pixel in the wrapped phase map, it is determined whether or not the pixel and its neighboring pixel to the left are within a same continuous region. In an example implementation, a particular pixel and its neighboring pixel directly to the left are determined to be within the same continuous region when the difference between the phase value of the particular pixel and the phase values of each of the next two pixels to the left of the particular pixel (the pixel directly to the left of the particular pixel and the second pixel to the left of the particular pixel) is less than a predefined threshold value.

At block 1008, for each pixel in the wrapped phase map, it is determined whether or not the pixel and its neighboring pixel to the right are within a same continuous region. In an example implementation, a particular pixel and its neighboring pixel directly to the right are determined to be within the same continuous region when the difference between the phase value of the particular pixel and the phase values of each of the next two pixels to the right of the particular pixel (the pixel directly to the right of the particular pixel and the second pixel to the right of the particular pixel) is less than a predefined threshold value.

At block 1010, each pixel is labeled according to the continuous region in which it resides.

At block 1012, pixels in any regions that are smaller than a threshold are processed. For example, in the second pass of a two-pass floodfill algorithm for region segmentation, tiny regions that are smaller than a threshold are either removed as noise or merged into neighboring regions, depending, for example, on whether they are isolated or not.

At block 1014, a continuous region mask is generated based on the region labels assigned to each pixel.

Figure 11:
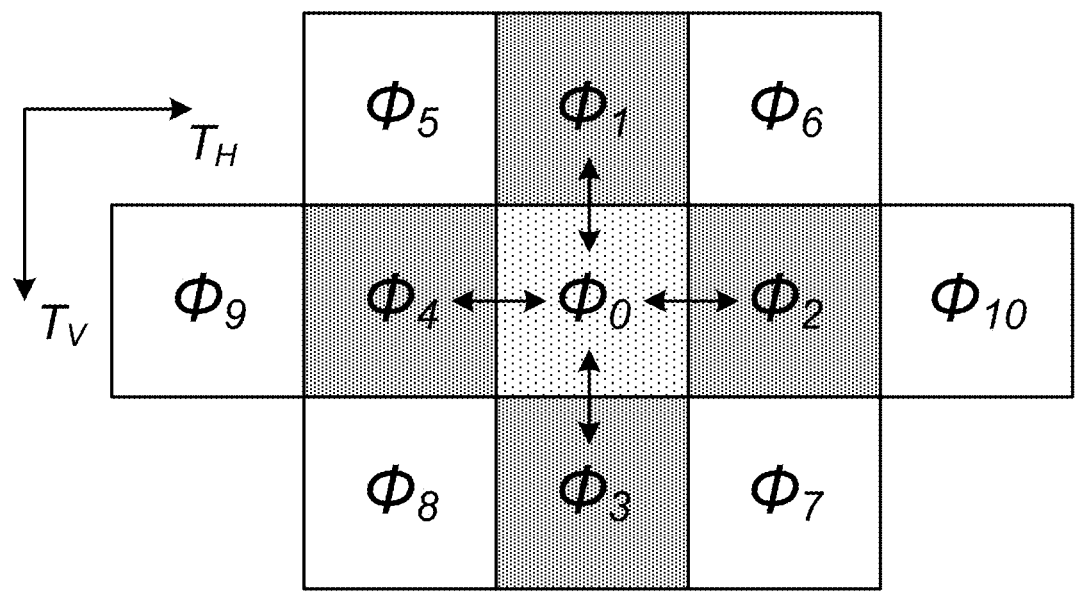
FIG. 11 is a pictorial diagram that illustrates neighboring pixels to be analyzed to determine if the pixels that are direct neighbors are within the same continuous region.

FIG. 11 illustrates the analysis performed for determining, for a particular pixel, whether the pixel and it's neighboring pixels are within the same continuous region. For example, neighboring pixels are labeled as being within the same region based on a set of conditions, such that, given a particular pixel in $\Phi_W$ having phase value $\phi_0$ (the pixel in the center of FIG. 11), it is determined to be connected with its four nearest neighbors, $\phi_1$ (the pixel above), $\phi_2$ (the pixel to the right), $\phi_3$ (the pixel below), and $\phi_4$ (the pixel to the left), according to:

$\phi_0$ is connected to $\phi_1$ if: $\max\{d(\phi_0,\phi_1), d(\phi_0,\phi_5), d(\phi_0,\phi_6)\} < T_V$ $\phi_0$ is connected to $\phi_3$ if: $\max\{d(\phi_0,\phi_3), d(\phi_0,\phi_7), d(\phi_0,\phi_8)\} < T_V$ $\phi_0$ is connected to $\phi_4$ if: $\max\{d(\phi_0,\phi_4), d(\phi_0,\phi_9)\} < T_H$ $\phi_0$ is connected to $\phi_2$ if: $\max\{d(\phi_0,\phi_2), d(\phi_0,\phi_{10})\} < T_H$ where $d(\phi_i, \phi_j) = \min\{|\phi_i - \phi_j|, |\phi_i - \phi_j + 2\pi|, |\phi_i - \phi_j - 2\pi|\}$ and $T_V$ and $T_H$ are two predefined thresholds.

As described above, the result of the region segmentation is a continuous region mask $\Psi$.

Period Disparity Voting

As discussed above, the embedded speckle in the captured images is unreliable for disambiguating the phase locally. However, a common period disparity given by the speckle at different locations within a single continuous region will be much more robust and reliable. Accordingly, the absolute phase can be recovered by finding the regional period disparities $\{D_m\}_{m=1}^{M}$, where there are M continuous regions in the continuous region mask $\Psi$, $D_m$ is an integer within [0, N-1], and N is the number of periods of fringe.

FIG. 12 illustrates a process for determining the period disparity for a particular region in the continuous region mask.

At block 1202, S sample locations $\{(x_s, y_s)\}_{s=1}^{S}$ are sampled within the continuous region. In an example implementation, 3% of the pixels within the region are sampled.

At block 1204 a patch centered at each sampled location in each captured image is identified. For example, a small patch $p_k(x_s, y_s)$ centered at $(x_s, y_s)$ in each captured image $I_k$ is identified. In an example implementation, each patch may be 5×5 pixels. The absolute depth at each sampled location, denoted as $\delta_s^k$, is determined by the vertical shift of $p_k(x_s, y_s)$ with respect to the corresponding reference image $I'_k$.

At block 1206, possible period disparities for each sampled location in each captured image are determined. The depth from fringe and the depth from speckle should be consistent at the same location. Accordingly, for each patch, $p_k(x_s, y_s)$, the N possible shifts in $I'_k$ derived from $\phi_s$ are determined. For example, patch-wise NCC may be used to determine the period disparity according to:

$$d_s^k = \arg\max_{d \in \{0, \ldots, N-1\}} \gamma\{p_k(x_s, y_s), q_k(x_s, y_s + \delta_s^k(\phi_s, d))\} \quad (9)$$

where $\delta_s^k(\phi_s, d)$ denotes the possible shift and $q_k(x, y)$ denote a small patch centered at $(x, y)$ in the reference image $I'_k$.

At block 1208, the most frequent period disparity across the sampled locations within the continuous region is identified as the period disparity for the region. For example, a histogram representing the distribution of $\{d_s^k\}_{s=1,k=1}^{S,3}$ is obtained, and the period disparity for the continuous region is determined as the most frequent value in the histogram.

Figure 13:
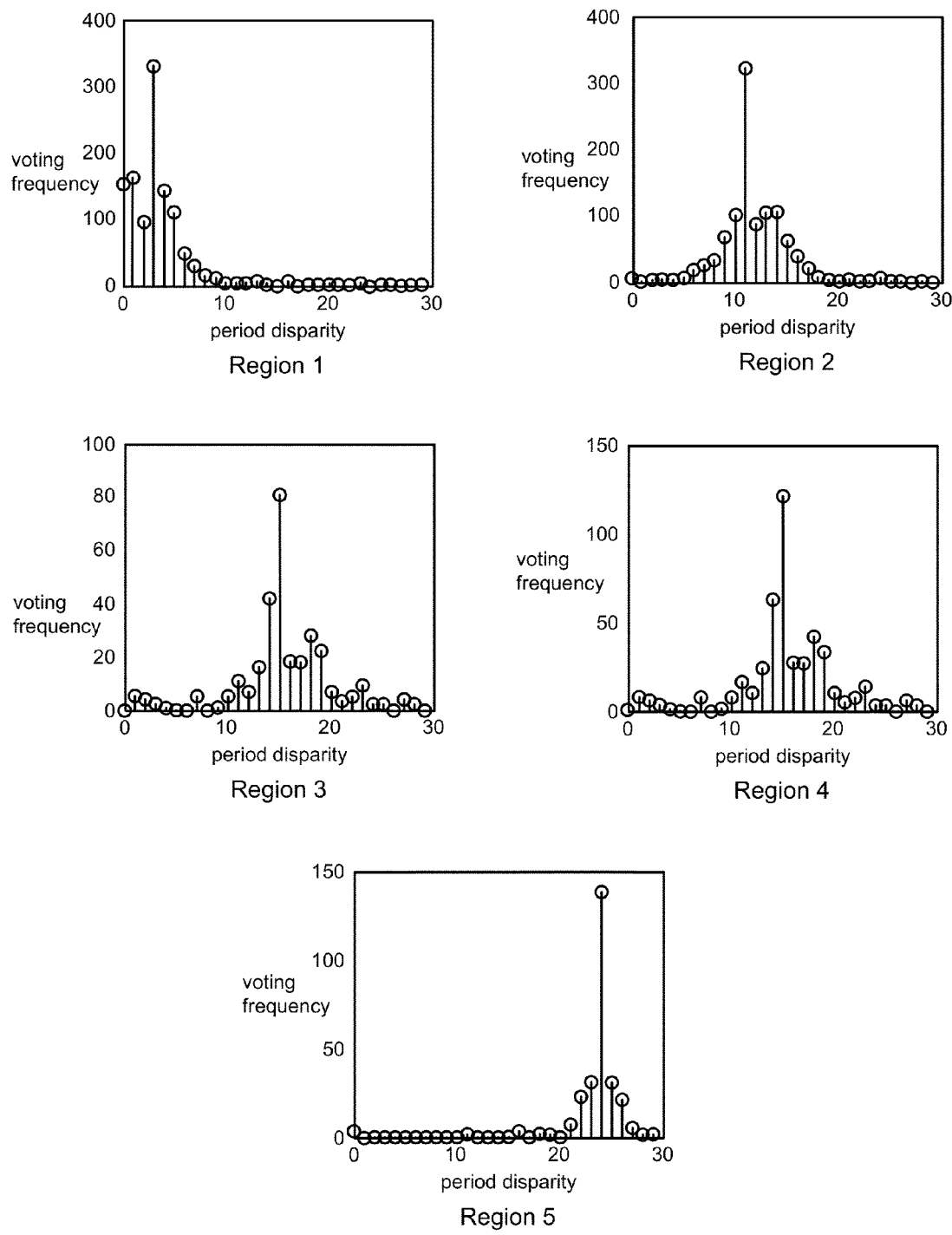
FIG. 13 is a collection of five example histograms for five respective regions of an example continuous region mask.

FIG. 13 illustrates example histograms for five example regions of an example continuous region mask. As illustrated in FIG. 13, there is a distinct peak in each histogram, which suggests the reliability of the voting process. Furthermore, the usefulness of the voting process is also evidenced by the fact that there are other values indicated in each of the histograms, indicating that not all speckles can be correctly distinguished.

The process illustrated in FIG. 12 is performed for each continuous region, resulting in a collection of regional period disparities, which can then, in turn, be used with the spatially unwrapped phase map to generate an absolute phase map, and finally, a depth map and 3D shape.

CONCLUSION

Although the subject matter has been described in language specific to structural features and/or methodological operations, it is to be understood that the subject matter defined in the appended claims is not necessarily limited to the specific features or operations described. Rather, the specific features and acts are disclosed as example forms of implementing the claims.

What is claimed is:

1. A method comprising:
receiving a plurality of scene images that include a phase-shifted fringe embedded with a speckle pattern;
determining a wrapped phase map based at least in part on the plurality of scene images;
generating a continuous region mask, based at least in part on the wrapped phase map, wherein the continuous region mask identifies a plurality of continuous regions; and
determining, for at least one region in the plurality of continuous regions, a period disparity of the fringe for the at least one region.

2. A method as recited in claim 1, further comprising generating the phase-shifted fringe embedded with the speckle pattern such that:
a phase calculation is independent of the embedded speckle pattern;
the speckle pattern is embedded without reducing an amplitude of the fringe; and
a frequency of the fringe is not limited.

3. A method as recited in claim 1, further comprising generating the phase-shifted fringe embedded with the speckle pattern such that an order of the fringe is determined without calculating a difference of pixel intensity in each period.

4. A method as recited in claim 1, wherein the plurality of scene images consists of three scene images.

5. A method as recited in claim 1, wherein the plurality of scene images consists of a theoretical minimum number of scene images sufficient to compute absolute depth measurements.

6. A method as recited in claim 1, wherein the phase-shifted fringe comprises a sinusoidal fringe.

7. A method as recited in claim 1, wherein the speckle pattern is generated according to rules governing speckle size and speckle density.

8. A method as recited in claim 7, wherein a rule governing speckle size defines a speckle as having a size of K×K pixels, where K is determined at least in part by a resolution of a projector or a resolution of a camera.

9. A method as recited in claim 7, wherein a rule governing speckle density specifies that, within the speckle pattern, each area having a size equivalent to (3 speckles)×(3 speckles) includes one speckle.

10. A method as recited in claim 1, further comprising determining a spatially unwrapped phase map based at least in part on the wrapped phase map.

11. A method as recited in claim 10, further comprising determining an absolute phase map based at least in part on the spatially unwrapped phase map and the period disparity of the fringe for the at least one region.

12. One or more computer storage media comprising computer-executable instructions that, when executed, direct a processor to perform a method as recited in claim 1.

13. A method comprising:
embedding a distinguishable simulated random speckle pattern in each of three phase-shifted fringe patterns, resulting in three phase-shifted speckle-embedded fringe patterns;
capturing three reference images and three scene images while the three phase-shifted speckle-embedded fringe patterns are respectively projected;
generating a wrapped phase map based at least in part on the three scene images;
generating a spatially unwrapped phase map by removing from the wrapped phase map, discontinuities caused by a periodicity of the three phase-shifted fringe patterns;
generating a continuous region mask by comparing phase values of neighboring pixels in the wrapped phase map to segment the wrapped phase map into a plurality of continuous regions; and
determining a period disparity for each region of the plurality of continuous regions.

14. A method as recited in claim 13, wherein capturing the three reference images and three scene images while the three phase-shifted speckle-embedded fringe patterns are respectively projected includes:
capturing a first reference image at a reference plane while a first phase-shifted speckle-embedded fringe pattern of the three phase-shifted speckle-embedded fringe patterns is projected on the reference plane;
capturing a first scene image while the first phase-shifted speckle-embedded fringe pattern is projected on a scene;
capturing a second reference image at the reference plane while a second phase-shifted speckle-embedded fringe pattern of the three phase-shifted speckle-embedded fringe patterns is projected on the reference plane;
capturing a second scene image while the second phase-shifted speckle-embedded fringe pattern is projected on the scene;
capturing a third reference image at the reference plane while a third phase-shifted speckle-embedded fringe pattern of the three phase-shifted speckle-embedded fringe patterns is projected on the reference plane; and
capturing a third scene image while the third phase-shifted speckle-embedded fringe pattern is projected on the scene.

15. A method as recited in claim 13, wherein determining the period disparity for each region of the plurality of continuous regions includes, for each region:
identifying a plurality of sample locations in the region;
determining a plurality of possible period disparity values for the region by:
for each sample location of the plurality of sample locations in the region:
comparing phase values of one or more pixels centered at the sample location in the first scene image with phase values of one or more pixels centered at the sample location in the first reference image;
comparing phase values of one or more pixels centered at the sample location in the second scene image with phase values of one or more pixels centered at the sample location in the second reference image; and
comparing phase values of one or more pixels centered at the sample location in the third scene image with phase values of one or more pixels centered at the sample location in the third reference image; and identifying the period disparity for the region as the most frequently determined possible period disparity value among the plurality of possible period disparity values for the sample locations within the region.

16. A method as recited in claim 15, wherein identifying the period disparity for the region includes generating a histogram based at least in part on the plurality of possible period disparity values for the sample locations within the region.

17. A system comprising:

a projector;

a camera; and a computing device communicatively coupled to the camera, the computing device including:

a communication interface for receiving from the camera, images of a scene, the images including a phase-shifted fringe embedded with a secondary pattern, wherein the phase-shifted fringe embedded with the secondary pattern is projected from the projector onto the scene;

a wrapped phase map module to generate a wrapped phase map based at least in part on the images of the scene; and a phase recovery module to generate an absolute phase map based at least in part on regional period disparities within the wrapped phase map, wherein the phase recovery module comprises a period disparity voting module to determine a regional period disparity value for one or more regions within the wrapped phase map.

18. A system as recited in claim 17, wherein the phase recovery module further comprises a continuous region detection module to generate a continuous region mask that indicates a plurality of continuous regions within the wrapped phase map.

19. A system as recited in claim 17, wherein the secondary pattern includes a speckle pattern.

* * * * *